C. J. PATTERSON.
AUTO STEERING DEVICE.
APPLICATION FILED NOV. 23, 1915.

1,226,586.

Patented May 15, 1917.

Witness
W. S. McDowell

Inventor
C. J. Patterson
By Victor J. Evans
Attorney

UNITED STATES PATENT OFFICE.

CHESTER J. PATTERSON, OF WHITE ROCK, PENNSYLVANIA.

AUTO STEERING DEVICE.

1,226,586.   Specification of Letters Patent.   Patented May 15, 1917.

Application filed November 23, 1915. Serial No. 63,024.

*To all whom it may concern:*

Be it known that I, CHESTER J. PATTERSON, citizen of the United States, residing at White Rock, in the county of Lancaster and State of Pennsylvania, have invented new and useful Improvements in Auto Steering Devices, of which the following is a specification.

The invention relates to steering gear attachments for automobiles and the object thereof is to provide a device of this character capable of assisting and controlling the movement of the steering wheels of the steering gear.
Another object of the invention is the provision of an attachment for the above purpose that can be readily and conveniently attached to the steering gear of a standard form of automobile without requiring alterations to be made in said steering gear for the reception of the attachment.

A further object is to produce an attachment for steering gears of automobiles which will eliminate jar, shock, strain or vibration on the part of the steering wheel and component parts and which will automatically keep the automobile straight when running over rough, muddy or sandy roads.

Still further objects reside in a device of this type which will prevent accidents, if portions of the steering gear should break or become disabled, and also relieve the driver of the automobile from physical and mental strain.
Other objects reside in the elimination of rattle in the various joints in the steering gear and in reducing wear and tear upon the several parts thereof.

In addition to these objects, various improvements in the construction and operation of the device are fully brought out in the following description, when read in conjunction with the accompanying drawings, in which, Figure 1 is a plan view of a portion of the steering gear of an automobile illustrating the application of the invention thereto;

Figure 1:
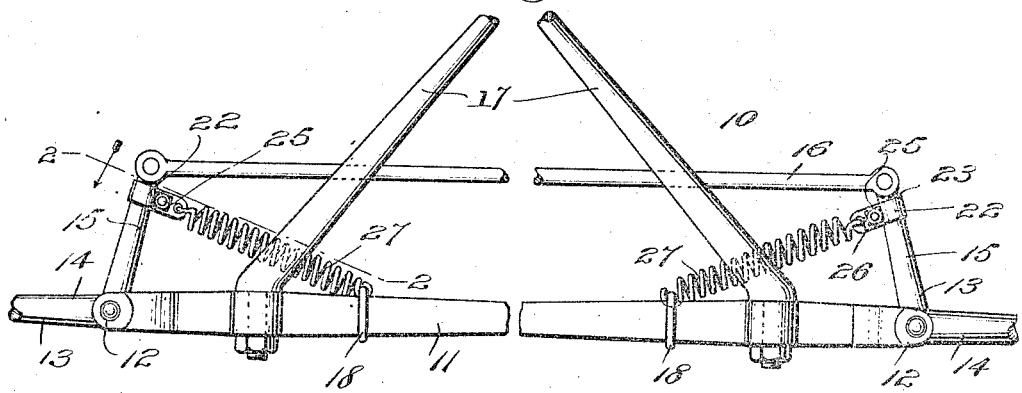
Figure 2:
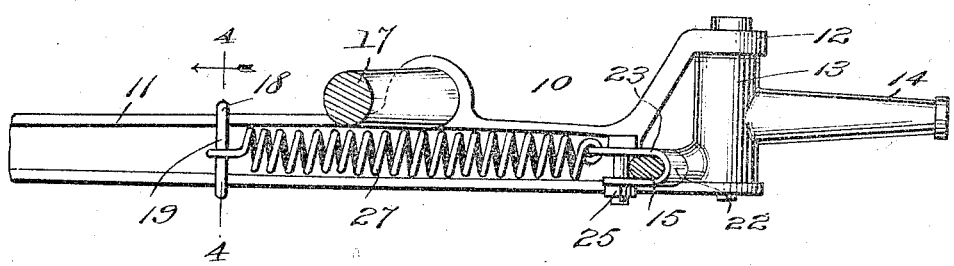
Fig. 2 is a fragmentary vertical section on the line 2—2 of Fig. 1.
Figure 3:
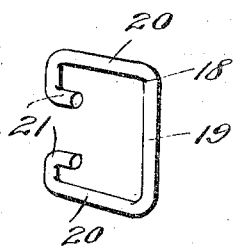
Fig. 3 is a detail perspective view of one of the attachment clips.
Figure 4:
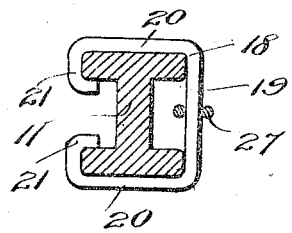
Fig. 4 is a transverse section on the line 4—4 of Fig. 2;
Figure 5:
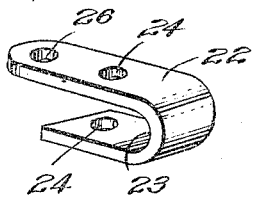
Fig. 5 is a detailed perspective view of the steering knuckle clamps.

Referring to the drawings the preferred embodiment of the invention comprises a steering gear 10, associated with an automobile, or other vehicle (not shown). The steering gear consists of the usual axle 11 in which are formed bearings 12 for the reception of steering knuckles 13, the latter comprising wheel receiving spindles 14 and
crank arms 15. A connecting rod 16 unites the crank arms 15 and is associated in any suitable manner with the steering column (not shown) of the automobile, in order that a pivoted movement may be imparted to the steering knuckles 13. As, will, of course, be understood radius rods 17 are connected with the axle 11 and extend to the automobile body in order to brace the axle 11. All of the above mechanism is of the general formation and a more extended explanation of the same is accordingly omitted. It is to be understood, however, that any preferred form of steering gear may be utilized, as, the form above referred to, is used for purposes of description and illustration only.

Clips 18 are passed over the axle 11 near the medial portion thereof where the cross sectional area is slightly reduced and thence forced outwardly until the same are wedged tightly against the relatively enlarged portions of the axle. The axle 11 being approximately I shaped in cross section, the clips 18 are formed with a vertical shank portion 19 provided with continuous laterally bent portions 20 which terminate in axle gripping fingers 21.

Secured to the crank arms 15, of the steering knuckles 13, are clamps 22, preferably formed of a single strip of metal, bent as at 23 in order to encircle and engage the arms 15. Alining apertures 24 are formed in the clamps 22 and through which are passed bolts, or other members 25 by which the clamps 22 are firmly secured, in a fixed position, upon the crank arms 15.

Formed in the outer end of the clamps 22 are openings 26 through which are passed and secured the ends of strong helical springs 27, having their opposite ends secured to the clips 18 adjacent the axle 11. The tension of the springs 27 is equally distributed upon the crank arms 15 and normally tense to pull the said arms inwardly, the connecting rod 16 limiting the inward movement thereof.

With this construction it will be obvious that the normal position of the spindles 14, of the knuckles 13 is in direct alinement, which results in imparting a straight ahead direction of movement to the automobile. When, however, the steering knuckles 13 are operated to turn the car from its initial path of movement, a stronger tension will be placed upon one of the steering knuckles and a reduction in the tension of the co-operating knuckle, so that if an accident should occur to the steering mechanism the tension imparted to one of the knuckles, by the relatively stretched spring will be sufficient to restore the running gear to its normal position after which the automobile may be brought to a stop.

Having thus described the invention, what is claimed as new is:—

The combination with the steering gear of a motor vehicle including an axle increasing in cross sectional dimensions from the center toward the outer ends, of clips surrounding said axle, and frictionally engaging the same and each comprising a vertical shank portion and laterally bent portions overlying the top and bottom of the axle and having the terminals thereof formed to provide gripping fingers engaging the top and bottom edges of the axle, substantially U-shaped clamps surrounding the respective spindle arms of the steering gear, bolts passed through the legs of the clamps and acting to hold the latter upon the arms, and springs each having one end secured to one of said clips and the other end fastened to the corresponding clamp, said springs acting to hold the spindles in horizontal alinement with the axle and to draw said clips toward the outer ends of the axle to create a binding action between the clips and the tapering portion of the axle.

In testimony whereof I affix my signature.

CHESTER J. PATTERSON.